(12) United States Patent  
Kimura

(10) Patent No.: US 9,726,321 B2  
(45) Date of Patent: Aug. 8, 2017

(54) INBUILT COMPONENT FIXING STRUCTURE OF RESIN TANK

(71) Applicant: Toyota Jidosha Kabushiki Kaisha, Toyota-shi, Aichi-ken (JP)

(72) Inventor: Miki Kimura, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 15/197,935

(22) Filed: Jun. 30, 2016

(65) Prior Publication Data

US 2017/0037999 A1    Feb. 9, 2017

(30) Foreign Application Priority Data

Aug. 6, 2015 (JP) ................... 2015-156397

(51) Int. Cl.
```
F16M 13/00      (2006.01)
F16M 13/02      (2006.01)
B60K 15/03      (2006.01)
```

(52) U.S. Cl.
CPC ....... F16M 13/02 (2013.01); B60K 15/03177 (2013.01); *B60K 2015/03467* (2013.01); *B60K 2015/03493* (2013.01)

(58) Field of Classification Search
CPC .. F16M 2200/08; F16M 13/00; F16M 11/041; F16M 11/10; F16M 11/22; F16M 13/02; F16M 13/022; F16M 11/24; F16M 11/08; F16M 11/00; F16M 5/00; F16M 11/38; F16M 11/14; F16M 11/2014; F16M 11/42

USPC ....... 248/346.01, 346.03, 346.07, 346.5, 907  
See application file for complete search history.

(56) References Cited

U.S. PATENT DOCUMENTS

| | | | | |
|---|---|---|---|---|
| 6,227,513 | B1 * | 5/2001 | Richard | ................. A47G 7/025 211/43 |
| 6,464,184 | B1 * | 10/2002 | Lytle | ................. B01F 15/00733 248/126 |
| 7,708,242 | B1 * | 5/2010 | Petrashune | ....... B01F 15/00733 220/630 |
| 8,011,701 | B2 * | 9/2011 | Taylor | ..................... B44D 3/00 248/154 |

(Continued)

FOREIGN PATENT DOCUMENTS

| | | |
|---|---|---|
| JP | 2009-526665 A | 7/2009 |
| JP | 2010-533079 A | 10/2010 |
| JP | 2014088172 A | 5/2014 |

*Primary Examiner* — Steven Marsh  
(74) *Attorney, Agent, or Firm* — Dinsmore & Shohl LLP

(57) ABSTRACT

An inbuilt component fixing structure of a resin tank includes: a fastening seat that is provided to the inbuilt component, that is formed with a through-hole configured to fasten and fix the inbuilt component to the resin tank, and that has a contact face that contacts an inner face of the resin tank; a fixing section that projects out from the inner face and pierces through the through-hole, the fastening seat being fastened and fixed by being sandwiched between a jutting-out portion formed at a portion of the fixing section that has pierced through the through-hole, the jutting-out portion jutting out to a peripheral portion of the through-hole; and a weak portion that is formed at the fastening seat, that is thinner than a general portion of the fastening seat, and that has a lower rigidity in a removal direction of the fastening seat than the fixing section.

4 Claims, 10 Drawing Sheets

(56) References Cited

U.S. PATENT DOCUMENTS

| | | | | |
|---|---|---|---|---|
| 8,641,005 B2* | 2/2014 | Cimaglio | .......... | B01F 15/00772 |
| | | | | 248/121 |
| 8,646,737 B1* | 2/2014 | Sharpless | .......... | B01F 15/00733 |
| | | | | 108/55.1 |
| 8,876,069 B2* | 11/2014 | Cimaglio | .......... | B01F 15/00746 |
| | | | | 248/122.1 |
| 2004/0021043 A1* | 2/2004 | Zagorsky | .......... | B01F 15/00733 |
| | | | | 248/146 |
| 2006/0261222 A1* | 11/2006 | Lidie | ................ | B01F 15/00733 |
| | | | | 248/210 |
| 2009/0019683 A1 | 1/2009 | Jannot et al. | | |
| 2010/0212806 A1 | 8/2010 | Lemoine et al. | | |
| 2014/0117023 A1 | 5/2014 | Ehler et al. | | |

\* cited by examiner

INBUILT COMPONENT FIXING STRUCTURE OF RESIN TANK

CROSS-REFERENCE TO RELATED APPLICATION

This application is based on and claims priority under 35 USC 119 from Japanese Patent Application No. 2015-156397 filed on Aug. 6, 2015, the disclosure of which is incorporated by reference herein.

BACKGROUND

Technical Field

The present disclosure relates to a fixing structure of an inbuilt component fixed inside a resin tank.

Related Art

Technology exists, as technology for fixing an inbuilt component inside a fuel tank formed of resin, in which a portion of the fuel tank is melted, and the melted portion is applied with pressure from the outside and pressed out in a state pressed into a through-hole of a fastening seat provided to the inbuilt component. The resin is cooled and solidified in a state in which a peripheral portion to the through-hole of the fastening seat is sandwiched between the pressed-out portion and another portion of the fuel tank, to fix the inbuilt component inside the fuel tank (see, for example, Japanese National-Phase Publication 2010-533079).

In the technology described in Japanese National-Phase Publication 2010-533079, a slot is formed at the periphery of the through-hole of the fastening seat. Thus, when fixing the fastening seat to the fuel tank, the melted portion of the resin enters inside the slot when the portion of the fuel tank is melted. The amount of resin of the fuel tank is reduced (the thickness is thinner) by the portion corresponding to the slot, and there is a possibility that the durability of the fuel tank is reduced.

SUMMARY

In consideration of the above circumstances, one aspect of the present disclosure is to provide an inbuilt component fixing structure of a resin tank that is capable of suppressing a reduction in the durability of a resin tank to which an inbuilt component is fixed.

An inbuilt component fixing structure of a resin tank of a first aspect of the present disclosure includes: a plate shaped fastening seat that is provided to an inbuilt component disposed inside a resin tank, that is formed with a through-hole configured to fasten and fix the inbuilt component to the resin tank, and that has a contact face that contacts an inner face of the resin tank that has a flat shape; a fixing section that projects out from the inner face of the resin tank and pierces through the through-hole of the fastening seat, the fastening seat being fastened and fixed by being sandwiched between the inner face of the resin tank and a jutting-out portion formed at a portion of the fixing section that has pierced through the through-hole, the jutting-out portion jutting out to a peripheral portion of the through-hole; and a weak portion that is formed at a location of the fastening seat corresponding to a periphery of the jutting-out portion, that is thinner than a general portion of the fastening seat, and that has a lower rigidity in a removal direction of the fastening seat than the fixing section.

In the internal component fixing structure of a resin tank of the first aspect, since the weak portion is formed at the fastening seat, the weak portion of the fastening seat breaks before the fixing section in cases in which excessive force in a removal direction of the fastening seat (hereafter simply referred to as "removal direction") has acted on the fastening seat. This enables excessive force in the removal direction to be suppressed from acting on the fixing section, thereby enabling a reduction in the durability of the fuel tank originating at the fixing section to be suppressed.

In the internal component fixing structure of a fuel tank, the contact face of the fastening seat with the inner face of the resin tank has a flat shape. Thus, there are no portions for molten resin to enter when the fixing section is being molded, thereby suppressing portions with a small amount of resin (thin portions) to be suppressed from being formed at the portion of the resin tank corresponding to the fastening seat. This enables a reduction in the durability of the resin tank originating at the periphery of the fixing section to be suppressed.

An inbuilt component fixing structure of a resin tank of a second aspect of the present disclosure is the internal component fixing structure of a resin tank of the first aspect, wherein a circular ring-shaped groove portion is formed at a face of the fastening seat at the opposite side in a plate thickness direction to the contact face, so as to surround the jutting-out portion, and the weak portion is a thin portion formed between the groove portion and the contact face.

In the internal component fixing structure of a resin tank of the second aspect, the circular ring-shaped groove portion is formed at the fastening seat so as to surround the jutting-out portion, namely, the weak portion is formed at the fastening seat so as to surround the jutting-out portion. This enables the force acting on the fastening seat in the removal direction to be evenly borne about its circumference at the weak portion, thereby enabling the force in the removal direction to be suppressed from concentrating at a portion of the weak portion such that the weak portion breaks at an early stage. In other words, breaking of the weak portion is more easily controlled.

An inbuilt component fixing structure of a resin tank of a third aspect of the present disclosure is the internal component fixing structure of a resin tank of the second aspect, wherein a coupling portion, that extends from one groove wall to another groove wall and couples both the groove walls together, is provided to the groove portion.

In the internal component fixing structure of a resin tank of the third aspect, the coupling portion that couples both groove walls together is provided to the groove portion. This enables the rigidity in the removal direction of the portion (including the weak portion) of the fastening seat corresponding to the groove portion to be more easily secured than by adjusting the thickness of the thin portion, this being the weak portion, of the fastening seat.

An inbuilt component fixing structure of a resin tank of a fourth aspect of the present disclosure is the internal component fixing structure of a resin tank of the third aspect, wherein a cutout, that extends along a direction intersecting an extension direction of the coupling portion, is formed at a surface of the coupling portion.

In the internal component fixing structure of a resin tank of the fourth aspect, the cutout is formed extending in a direction intersecting the extension direction at the surface of the coupling portion. This enables the rigidity of the coupling portion in the removal direction to be partially reduced, compared, for example, to a configuration in which the cutout is not formed at the surface of the coupling portion. This enables a difference in rigidity in the removal direction of the portion (including the weak portion) of the fastening seat corresponding to the groove portion to be reduced. The breaking of the weak portion is thereby more easily controlled, while securing rigidity in the removal direction of the portion of the fastening seat corresponding to the groove portion.

One aspect of the present disclosure is that it can provide the inbuilt component fixing structure of a resin tank capable of suppressing a reduction in the durability of the resin tank to which the inbuilt component is fixed.

BRIEF DESCRIPTION OF THE DRAWINGS

Exemplary embodiments of the present disclosure will be described in detail based on the following figures, wherein.

DETAILED DESCRIPTION

First Exemplary Embodiment

Explanation follows regarding an inbuilt component fixing structure of a resin tank according to a first exemplary embodiment of the present disclosure.

An inbuilt component fixing structure (hereafter referred to as "fixing structure" as appropriate) 18 of a resin tank of the present exemplary embodiment is a fixing structure that fastens fastening seats 26 of an inbuilt component 24 to a resin tank 20 using crimped fixing sections 22 of the resin tank 20 to fix the inbuilt component 24 inside the resin tank 20.

Figure 1:
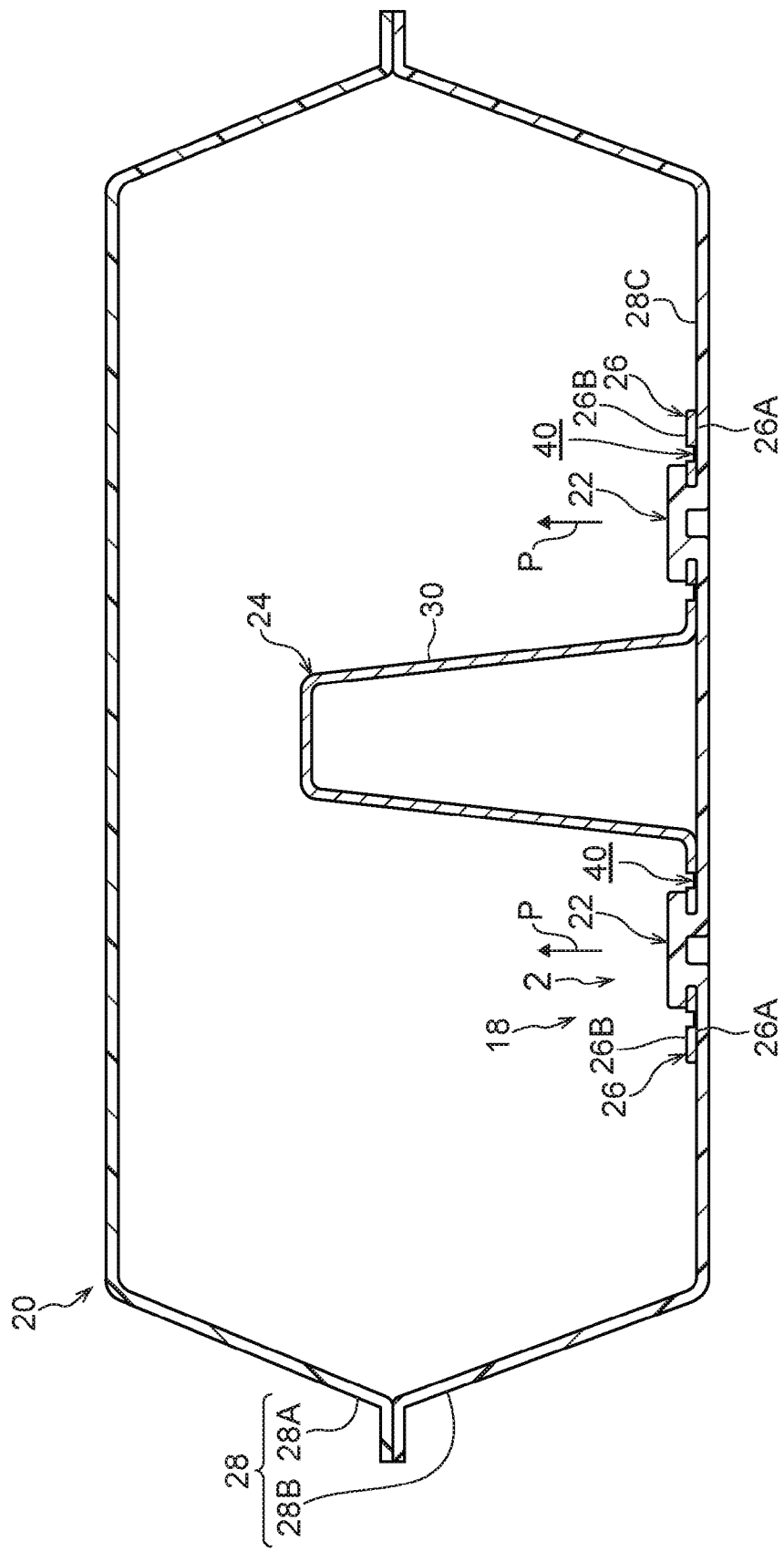
FIG. 1 is a cross-section of a resin tank, illustrating an inbuilt component fixing structure of a resin tank according to a first exemplary embodiment of the present disclosure.

As illustrated in FIG. 1, the resin tank 20 of the present exemplary embodiment is employed as a fuel tank installed in a vehicle. The resin tank 20 includes box shaped tank main body 28 capable of storing fuel inside.

The tank main body 28 is formed of resin (thermoplastic resin in the present exemplary embodiment). Specifically, the tank main body 28 is configured including a resin layer, and a barrier layer that has a lower fuel permeability (fuel is not liable to permeate) than the resin layer. High-density polyethylene (HDPE), for example, may be employed as the resin configuring the resin layer. Ethylene vinyl alcohol (EVOH) may be employed as the material forming the barrier layer.

Note that an opening or the like is formed in the tank main body 28 in order to connect piping; however, illustration of the opening or the like is omitted.

The tank main body 28 is formed in a box shape by joining (welding) outer peripheral edge portions of two members divided above and below, these being a tank configuration member 28A and a tank configuration member 28B. The tank configuration member 28A has an overall shape of an upward protrusion (the shape illustrated in FIG. 1). The tank configuration member 28B has an overall shape of a downward protrusion (the shape illustrated in FIG. 1).

As illustrated in FIG. 1, the fastening seats 26 of the inbuilt component 24 are fixed to the tank main body 28 at a bottom portion of the tank main body 28 (a bottom portion of the tank configuration member 28B) by the crimped fixing sections 22 formed to this bottom portion.

The inbuilt component 24 is configured including a substantially circular tube shaped main body section 30 that is closed off at one end portion thereof (an upper end portion in FIG. 1), and a pair of the fastening seats 26 that each jut out from another end portion (a lower end portion in FIG. 1) of the main body section 30 toward the outer peripheral side. The inbuilt component 24 is employed as a reinforcement member to suppress a reduction in the strength of the tank main body 28. Specifically, in the inbuilt component 24 of the present exemplary embodiment, in cases in which the internal pressure of the tank main body 28 has fallen and a ceiling portion of the tank main body 28 (a ceiling portion of the tank configuration member 28A) has approached the bottom portion, for example, the ceiling portion and the one end portion of the main body section 30 abut each other and the main body section 30 supports the ceiling portion, thereby enabling excess deformation of the tank main body 28 to be suppressed, and a reduction in the strength of the tank main body 28 to be suppressed.

The inbuilt component 24 of the present exemplary embodiment is formed of a different material to the thermoplastic resin configuring the tank main body 28. A resin material (such as polyacetal (POM)) or a metal material may be employed as the different material, as long as the material has a higher melting temperature than the thermoplastic resin configuring the tank main body 28.

Figure 3:
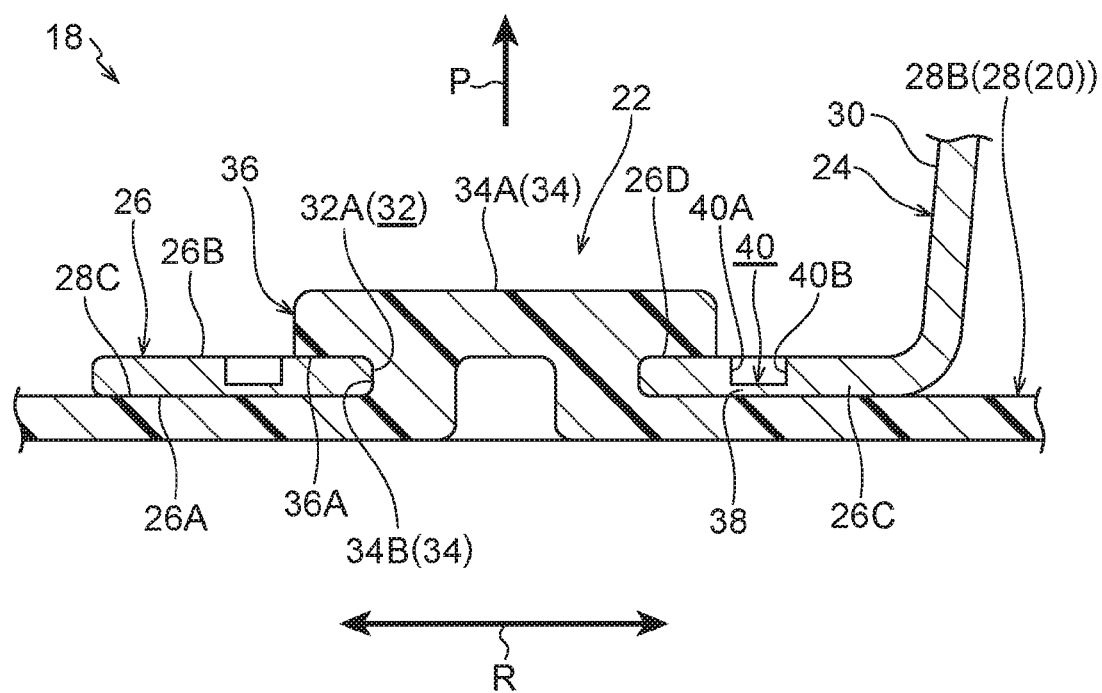
FIG. 3 is a cross-section along line 3-3 in FIG. 2.
Figure 4:
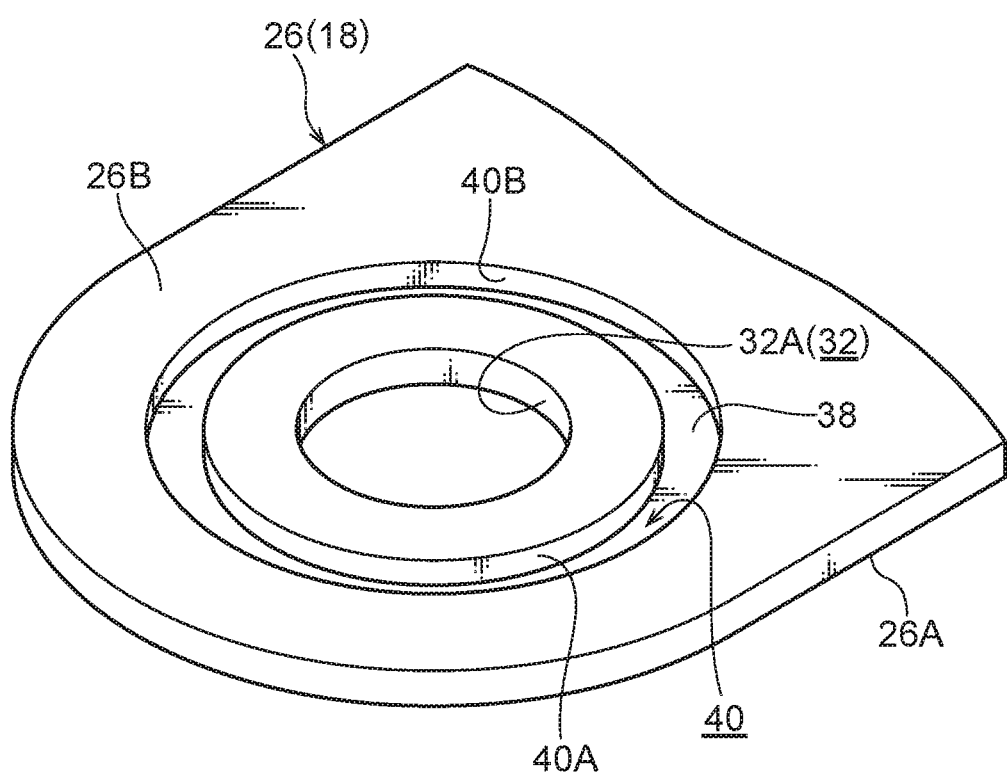
FIG. 4 is a perspective view illustrating the periphery of a through-hole of a fastening seat of the first exemplary embodiment.

As illustrated in FIGS. 3 and 4, each fastening seat 26 is formed in a plate shape, and juts out from the other end portion of the main body section 30 toward the outer peripheral side with a leading end side curving in a semi-circular shape. One plate face 26A (a lower face in FIGS. 1 and 3) of the fastening seat 26 has a flat shape, and contacts (is in close contact with) an inner face 28C, corresponding to the bottom portion of the tank main body 28.

Note that the plate face 26A of the fastening seat 26 of the present exemplary embodiment is an example of a contact face of a fastening seat of the present disclosure. In cases in which only a portion of the plate face 26A contacts the inner face 28C, the portion of the plate face 26A contacting the inner face 28C is a contact face of a fastening seat of the present disclosure.

Another plate face 26B (an upper face in FIGS. 1 and 3) of the fastening seat 26 also has a flat shape. A groove portion 40, described later, is formed at the plate face 26B.

A through-hole 32 is formed piercing through the fastening seat 26 in the thickness direction (plate thickness direction) at the leading end side of the fastening seat 26. An inserted portion 34B (see FIG. 3), described later, of the crimped fixing section 22 is disposed inside the through-hole 32.

Note that in the present exemplary embodiment, the pair of (two) fastening seats 26 are provided to the main body section 30 of the inbuilt component 24; however, the present disclosure is not limited to this configuration, and configuration may be such that one fastening seat 26, or three or more fastening seats 26, are provided to the main body section 30.

As illustrated in FIGS. 1 and 3, each crimped fixing section 22 is formed to the bottom portion of the tank main body 28, and is configured including a bulge section 34 projecting out inside the tank main body 28, and a jutting-out portion 36 formed at the bulge section 34.

The bulge section 34 projects out in the thickness direction (plate thickness direction) of the tank main body 28 and pierces through the through-hole 32 of the fastening seat 26. The bulge section 34 has a substantially circular tube shape with a hollow interior and an apex portion 34A that is closed off. An outer peripheral face of the portion of the bulge section 34 inserted into the through-hole 32 (hereafter referred to as "inserted portion 34B") contacts (is in close contact with) a hole wall face 32A of the through-hole 32.

The jutting-out portion 36 is formed at a portion of the bulge section 34 that has passed through the through-hole 32 (a passed-through portion), and juts out at the outer peripheral side of the bulge section 34 (in other words, the radial direction outside of the bulge section 34). Specifically, the jutting-out portion 36 juts out from the apex portion 34A of the bulge section 34 toward the outer peripheral side as far as a peripheral portion 26D of the through-hole 32 of the fastening seat 26. The jutting-out portion 36 is formed about the entire circumference in the circumferential direction of the bulge section 34, and has a larger diameter than the through-hole 32.

Together with the inner face 28C of the tank main body 28, the jutting-out portion 36 sandwiches the peripheral portion 26D of the fastening seat 26. Specifically, the peripheral portion 26D of the fastening seat 26 is sandwiched between a lower face 36A of the jutting-out portion 36 and the inner face 28C of the tank main body 28 to fasten and fix the fastening seat 26 to the tank main body 28.

Figure 2:
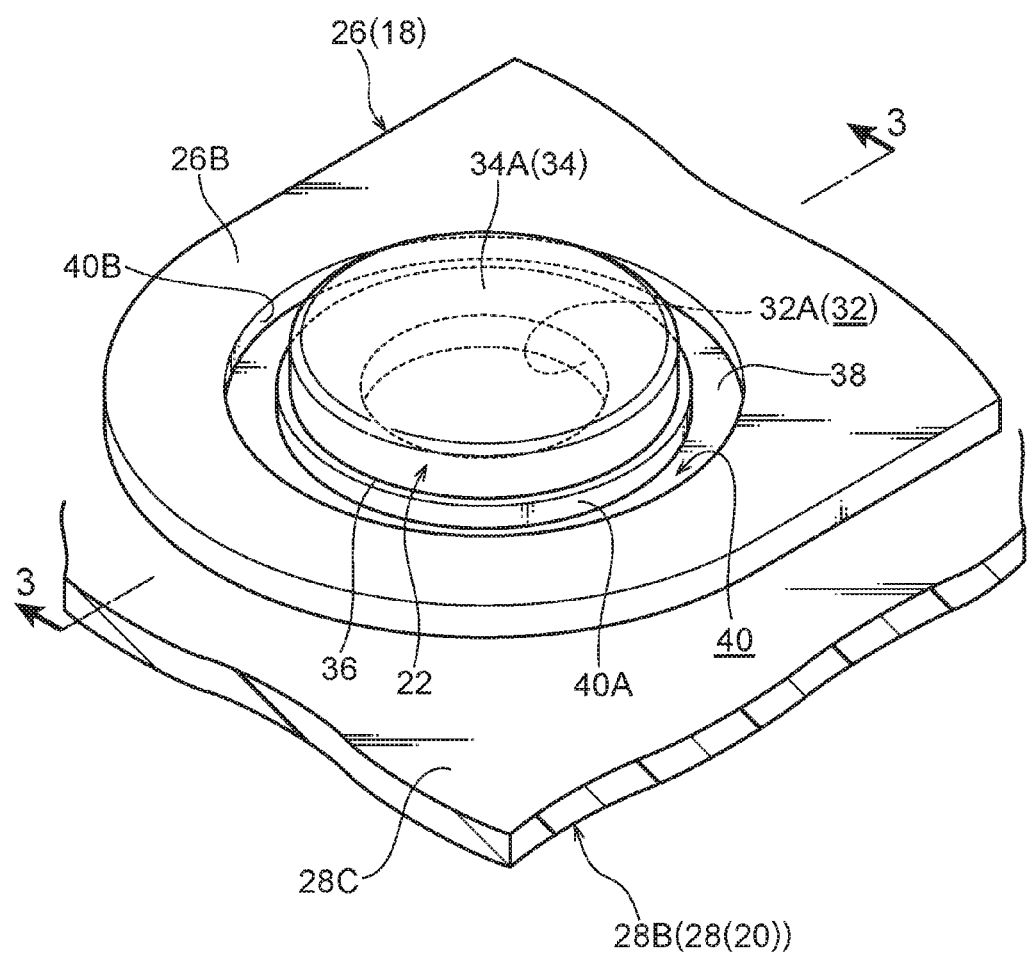
FIG. 2 is an enlarged perspective view of a portion indicated by the arrow 2 in FIG. 1.

As illustrated in FIGS. 2 and 4, a weak portion 38 is formed at the fastening seat 26 at a location corresponding to the periphery of the jutting-out portion 36 of the crimped fixing section 22. The weak portion 38 is a thin portion that is thinner than a general portion 26C of the fastening seat 26. Note that "general portion 26C" referred to herein refers to a portion of the fastening seat 26 where the groove portion 40, described later, is not formed.

The weak portion 38 has a lower rigidity in a direction of removing the fastening seat 26 (hereafter simply referred to as "removal direction") than the crimped fixing section 22. Specifically, the weak portion 38 has a lower rigidity in the removal direction than the inserted portion 34B of the crimped fixing section 22. Note that "removal direction" referred to herein referred to the direction illustrated by the arrow P in FIGS. 1 and 3.

As illustrated in FIG. 4, the circular ring-shaped groove portion 40 is formed at the plate face 26B of the fastening seat 26 so as to surround the jutting-out portion 36 of the crimped fixing section 22. A cross-section profile of the groove portion 40 in a direction orthogonal to the circumferential direction of the groove portion 40 has a substantially rectangular shape (see FIG. 3). Note that in the present exemplary embodiment, the cross-section profile of the groove portion 40 has a substantially rectangular shape as described above; however, the present disclosure is not limited to this configuration, and the cross-section profile of the groove portion 40 may, for example, have a semicircular shape or a triangular shape.

As illustrated in FIG. 3, one groove wall (an inner peripheral side wall face) 40A of the groove portion 40 is positioned further toward the outside in the radial direction of the through-hole 32 (the direction indicated by the arrow R in FIGS. 3 and 6) than the jutting-out portion 36 of the crimped fixing section 22.

In a state in which the fastening seat 26 has been pressed against a molten resin sheet 60, described later, by a flat leading end face 52A of an outer mold 52, described later, another groove wall (an outer peripheral side wall face) 40B of the groove portion 40 is positioned further toward the inside in the radial direction of the through-hole 32 than an outer edge 52B of the leading end face 52A.

As illustrated in FIG. 3, the weak portion 38 is a thin portion formed between a bottom face of the groove portion 40 and the plate face 26A of the fastening seat 26. The weak portion 38 of the present exemplary embodiment is thereby formed in a location corresponding to the groove portion 40 of the fastening seat 26.

Explanation follows regarding an example of a forming method of the fixing structure 18 of the present exemplary embodiment.

Explanation first follows regarding a fixing section molding device 42 employed in the forming method of the fixing structure 18.

Figure 5:
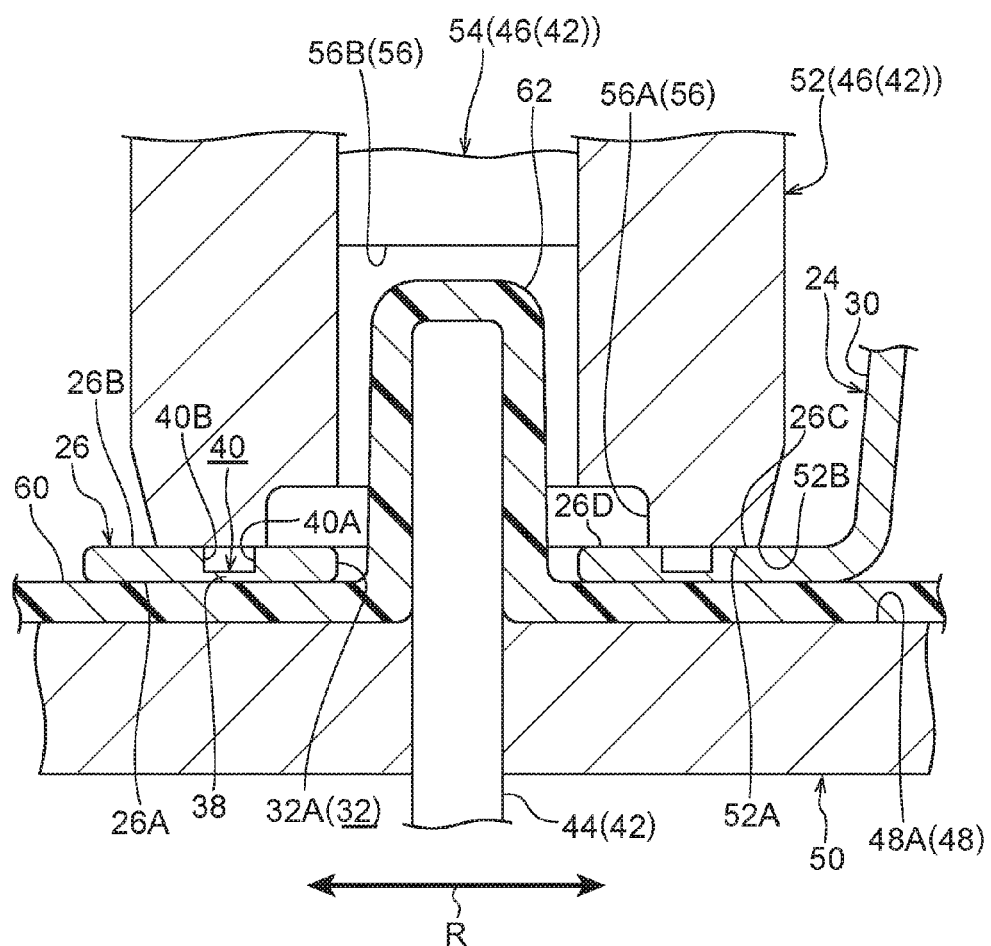
FIG. 5 is a cross-section of a fixing section molding device for forming a crimped fixing section of the first exemplary embodiment, illustrating a state prior to molding the crimped fixing section.
Figure 6:
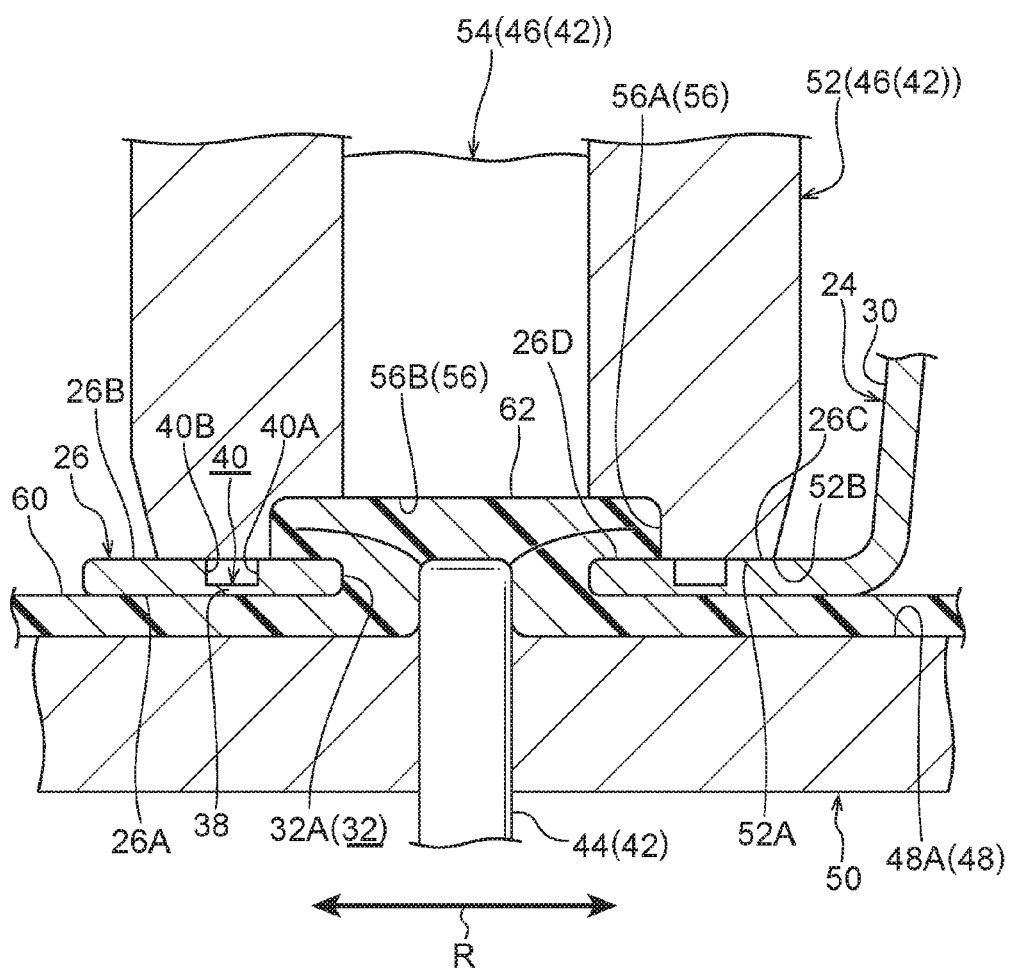
FIG. 6 is a cross-section of the fixing section molding device in FIG. 5, illustrating a state after molding the crimped fixing section.

As illustrated in FIGS. 5 and 6, the fixing section molding device 42 is a device for molding the crimped fixing section 22 in the tank main body 28. The fixing section molding device 42 includes a movable pin 44 for forming a bulge section 62 in the molten state resin sheet (hereafter referred to as "molten resin sheet" as appropriate) 60, and a pressurizing mold 46 that applies pressure so as to shape the bulge section 62 into the shape of the crimped fixing section 22.

The movable pin 44 is embedded in a mold 50 including a cavity 48 for molding the tank configuration member 28B from the molten resin sheet 60, and is configured such that a projection height from a cavity face 48A is adjustable. The bulge section 62 can be formed in the molten resin sheet 60 by making the movable pin 44 project out from the cavity face 48A.

The pressurizing mold 46 is capable of moving with respect to the mold 50, and houses the bulge section 62 inside to shape the bulge section 62 into the shape of the crimped fixing section 22. The pressurizing mold 46 includes the circular tube shaped outer mold 52 and an inner mold 54 that moves inside the outer mold 52. An inner space of the pressurizing mold 46 configures a cavity 56 that shapes the bulge section 62 into the shape of the crimped fixing section 22. Part of an inner face of the outer mold 52 configures a cavity face 56A for molding the jutting-out portion 36 of the crimped fixing section 22. A pressurizing face (a lower face in FIGS. 5 and 6) of the inner mold 54 is a location that presses an apex portion of the bulge section 62, and configures a cavity face 56B for molding an apex portion of the bulge section 34 of the crimped fixing section 22.

After the bulge section 62 has been housed inside the pressurizing mold 46, the inner mold 54 is moved and the bulge section 62 is applied with pressure and pressed out, such that the bulge section 62 is shaped into the shape of the cavity 56, namely, the shape of the crimped fixing section 22.

The movable pin 44, the pressurizing mold 46, and the mold 50 of the present exemplary embodiment are configured capable of being heated to a degree enabling the molten state of the molten resin sheet 60 to be maintained.

Explanation follows regarding the forming method of the fixing structure 18 using the fixing section molding device 42 described above.

First, the molten resin sheet 60 is manufactured. Next, in a state in which the movable pin 44 is made to project out from the cavity face 48A of the mold 50, the molten resin sheet 60 is guided into the cavity 48 of the mold 50, and is disposed together with the cavity face 48A. The movable pin 44 is made to project out from the cavity face 48A when this is performed, thereby forming the bulge section 62 to the molten resin sheet 60.

Next, in a state in which the bulge section 62 has been inserted into the through-hole 32 of the fastening seat 26, the inbuilt component 24 is positioned with respect to the molten resin sheet 60. The fastening seat 26 is then disposed on the molten resin sheet 60 and the bulge section 62 is pierced through the through-hole 32, and the one plate face 26A of the fastening seat 26 is made to contact (closely contact) the molten resin sheet 60.

Next, as illustrated in FIGS. 5 and 6, the bulge section 62 is housed inside the pressurizing mold 46 and shaped into the shape of the crimped fixing section 22. Specifically, the fastening seat 26 is pressed against and temporarily fixed to the molten resin sheet 60 by the leading end face 52A of the outer mold 52 while the bulge section 62 is housed inside the outer mold 52. The inner mold 54 is then moved, the bulge section 62 is applied with pressure and pressed out by the pressurizing face (the cavity face 56B), and the molten resin configuring the bulge section 62 is shaped into the shape of the cavity 48. The movable pin 44 is configured to move in synchronization with the movement of the inner mold 54, and its projection height from the cavity face 48A to lower when this occurs. The bulge section 62 is shaped into the shape of the crimped fixing section 22 in this manner.

Next, the molten resin is cooled and solidified, and the tank configuration member 28B is separated from the mold 50 after the molten resin sheet 60 has formed the tank configuration member 28B.

The tank main body 28 is then formed by superimposing and joining (by welding, for example) the outer peripheral edge portion of the tank configuration member 28A molded by a mold, not illustrated in the drawings, and the outer peripheral edge portion of the tank main body 28.

Explanation follows regarding operation and advantageous effects of the fixing structure 18 of the present exemplary embodiment.

In the fixing structure 18, since the weak portion 38 is formed at the fastening seat 26, the weak portion 38 of the fastening seat 26 breaks before the crimped fixing section 22 in cases in which excessive force in the removal direction of the fastening seat 26 has acted on the fastening seat 26. This enables excessive force in the removal direction of the fastening seat 26 to be suppressed from acting on the crimped fixing section 22, thereby enabling a reduction in the durability of the tank main body 28 (resin tank 20) originating at the crimped fixing section 22 to be suppressed.

In the fixing structure 18, the plate face 26A of the fastening seat 26 that contacts the inner face 28C of the tank main body 28 has a flat shape. Thus, there are no portions for the molten resin to enter when the crimped fixing section 22 is being molded as previously described (see FIG. 6), thereby suppressing portions with a small amount of resin (thin portions) to be suppressed from being formed to the portion of the tank main body 28 corresponding to the fastening seat 26. This enables a reduction in the durability of the tank main body 28 (resin tank 20) originating at the periphery of the crimped fixing section 22 to be suppressed.

In the fixing structure 18, the circular ring-shaped groove portion 40 is formed at the fastening seat 26 so as to surround the jutting-out portion 36, namely, the weak portion 38 is formed at the fastening seat 26 so as to surround the jutting-out portion 36. This enables the force acting on the fastening seat 26 in the removal direction to be evenly borne about its circumference at the weak portion 38, thereby enabling the force in the removal direction to be suppressed from concentrating at a portion of the weak portion 38 such that the weak portion 38 breaks at an early stage. In other words, breaking of the weak portion 38 is more easily controlled.

In the fastening seat 26, the position of the groove wall 40A of the groove portion 40 is set such that the groove wall 40A is positioned further toward the radial direction outside of the through-hole 32 than the jutting-out portion 36 of the crimped fixing section 22. This enables the molten resin to be suppressed from entering inside the groove portion 40 during molding of the crimped fixing section 22. This enables the amount of resin forming the crimped fixing section 22 to be suppressed from decreasing.

In the fastening seat 26, the position of the groove wall 40B is set such that, in the state in which the fastening seat 26 has been pressed against the molten resin sheet 60 by the leading end face 52A of the outer mold 52, the groove wall 40B of the groove portion 40 is positioned further toward the radial direction inside of the through-hole 32 than the outer edge 52B of the leading end face 52A. This enables the flat plate face 26B of the fastening seat 26 to be pressed by the flat leading end face 52A of the outer mold 52, thereby enabling the fastening seat 26 to be disposed parallel to the molten resin sheet 60. This enables a molding defect (shaping defect) of the crimped fixing section 22 to be suppressed from occurring.

The first exemplary embodiment is configured such that the circular ring-shaped groove portion 40 is formed at the plate face 26B of the fastening seat 26. However, the present disclosure is not limited to this configuration, and, for example, configuration may be such that groove portions or indented portions with spacings therebetween are formed at the plate face 26B of the fastening seat 26 so as to surround the through-hole 32.

Second Exemplary Embodiment

Explanation follows regarding an inbuilt component fixing structure (hereafter referred to as "fixing structure" as appropriate) 70 of a resin tank according to a second exemplary embodiment of the present disclosure. Note that similar configuration to that in the first exemplary embodiment is appended with the same reference numerals, and explanation thereof is omitted as appropriate.

Figure 7:
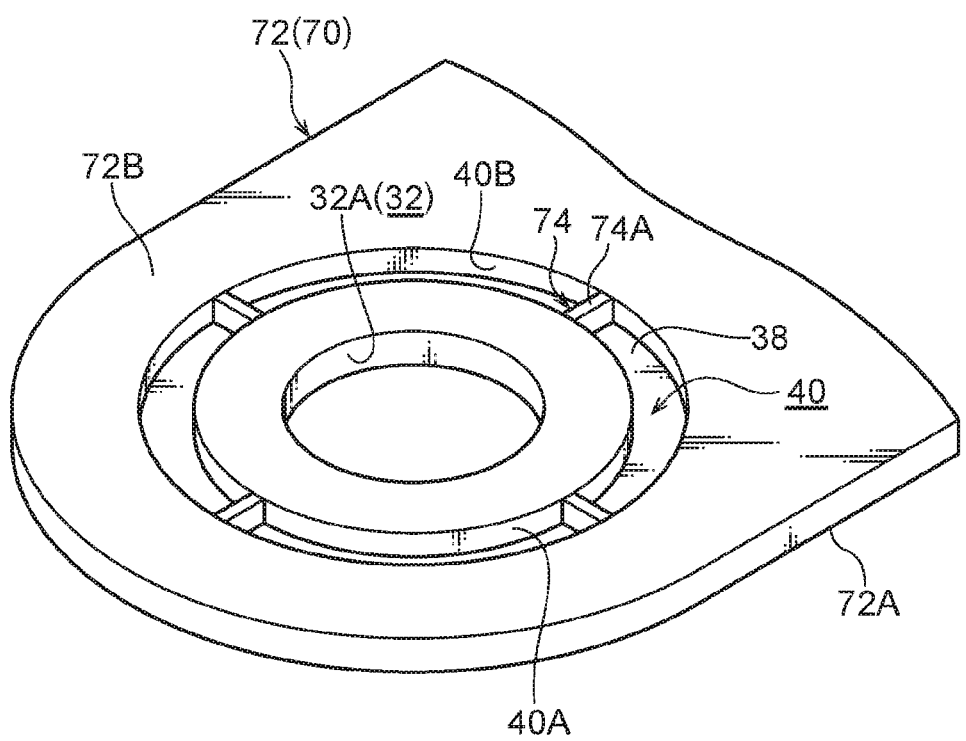
FIG. 7 is a perspective view illustrating the periphery of a through-hole of a fastening seat of a second exemplary embodiment.
Figure 8:
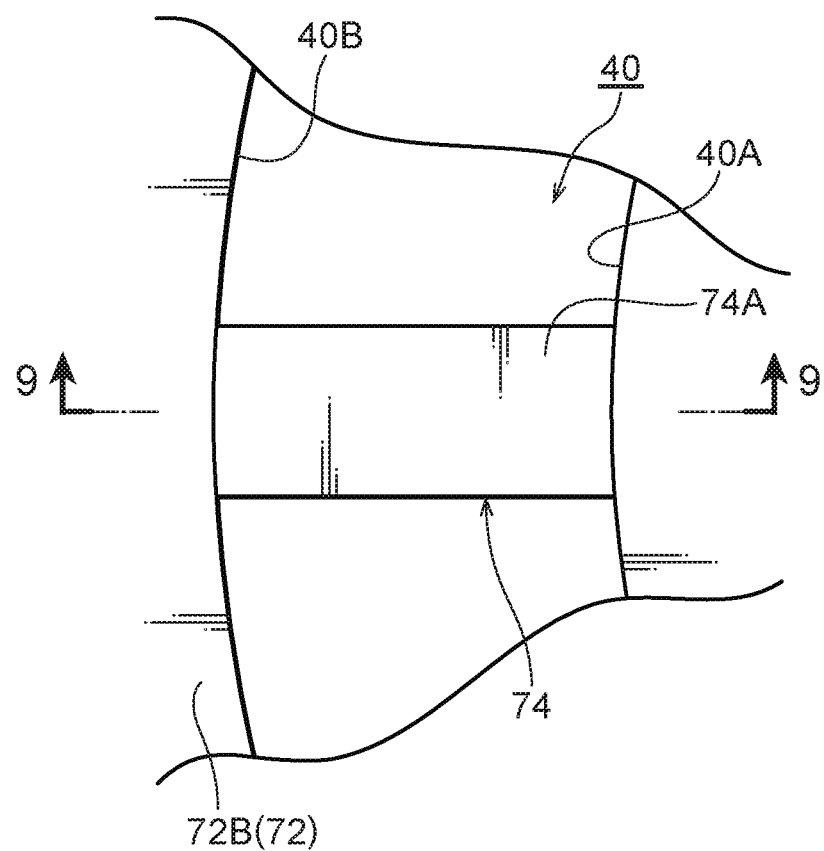
FIG. 8 is a plan view of the fastening seat in FIG. 7.
Figure 9:
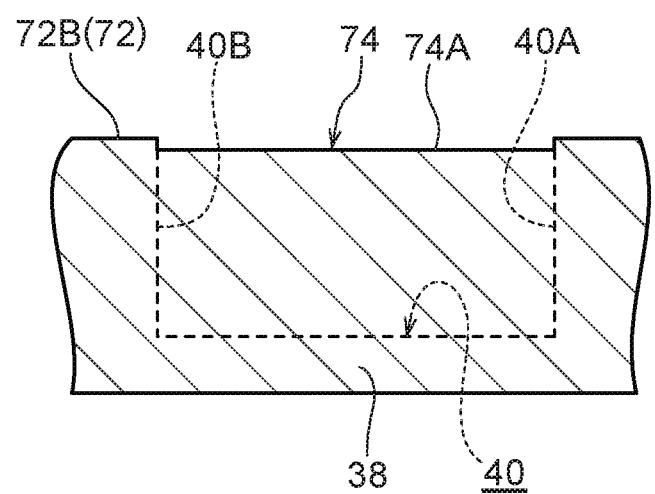
FIG. 9 is a cross-section along line 9-9 in FIG. 8.

As illustrated in FIGS. 7 to 9, the fixing structure 70 of the present exemplary embodiment has a similar configuration to the first exemplary embodiment, with the exception of the configuration of a fastening seat 72. Namely, the fixing structure 70 is configured including the crimped fixing section 22 (not illustrated in FIGS. 7 to 9), the fastening seat 72, and the weak portion 38 (see FIG. 9).

Similarly to the fastening seat 26 of the first exemplary embodiment, the fastening seat 72 has one plate face 72A contacting (in close contact with) the inner face 28C of the tank main body 28, and another plate face 72B formed with the groove portion 40. Also similarly to the fastening seat 26 of the first exemplary embodiment, the through-hole 32 is formed at the fastening seat 72.

Coupling portions 74, which extend from the groove wall 40A to the groove wall 40B and couple both groove walls 40A, 40B together, are provided to the groove portion 40 of the fastening seat 72. A cross-section profile of each coupling portion 74 orthogonal to the extension direction of the coupling portion 74 (hereafter simply referred to as "extension direction") has a substantially rectangular shape. Note that the present disclosure is not limited to this configuration, and, for example, the cross-section profile of the coupling portion 74 may have a trapezoidal shape or a triangular shape.

Plural of the coupling portions 74 are formed at spacings about the circumferential direction of the groove portion 40. Note that four of the coupling portions 74 are formed at equal spacings about the circumferential direction of the groove portion 40 in the present exemplary embodiment.

As illustrated in FIG. 9, the height of a surface 74A of each coupling portion 74 from the bottom face of the groove portion 40 is lower than the plate face 72B of the fastening seat 72.

Explanation follows regarding operation and advantageous effects of the fixing structure 70 of the present exemplary embodiment. Note that explanation regarding operation and advantageous effects similarly obtained in the first exemplary embodiment is omitted.

In the fixing structure 70, the coupling portions 74 that couple both groove walls 40A, 40B together are provided to the groove portion 40. This enables the rigidity in the removal direction of the portion (including the weak portion 38) of the fastening seat 72 corresponding to the groove portion 40 to be more easily secured than by adjusting the thickness (plate thickness) of the thin portion, this being the weak portion 38, of the fastening seat 72.

In the present exemplary embodiment, four of the coupling portions 74 are formed at the groove portion 40 of the fastening seat 72 at equal spacings about the circumferential direction of the groove portion 40; however, the present disclosure is not limited to this configuration. For example, the number of coupling portions 74 formed at the groove portion 40 of the fastening seat 72 may be three or less, or five or more. Note that the number of coupling portions 74 formed at the groove portion 40 in the present exemplary embodiment may also be applied to a third exemplary embodiment, described below.

Third Exemplary Embodiment

Explanation follows regarding an inbuilt component fixing structure (hereafter referred to as "fixing structure" as appropriate) 80 of a resin tank according to the third exemplary embodiment of the present disclosure. Note that similar configuration to that in the second exemplary embodiment is appended with the same reference numerals, and explanation thereof is omitted as appropriate.

Figure 10:
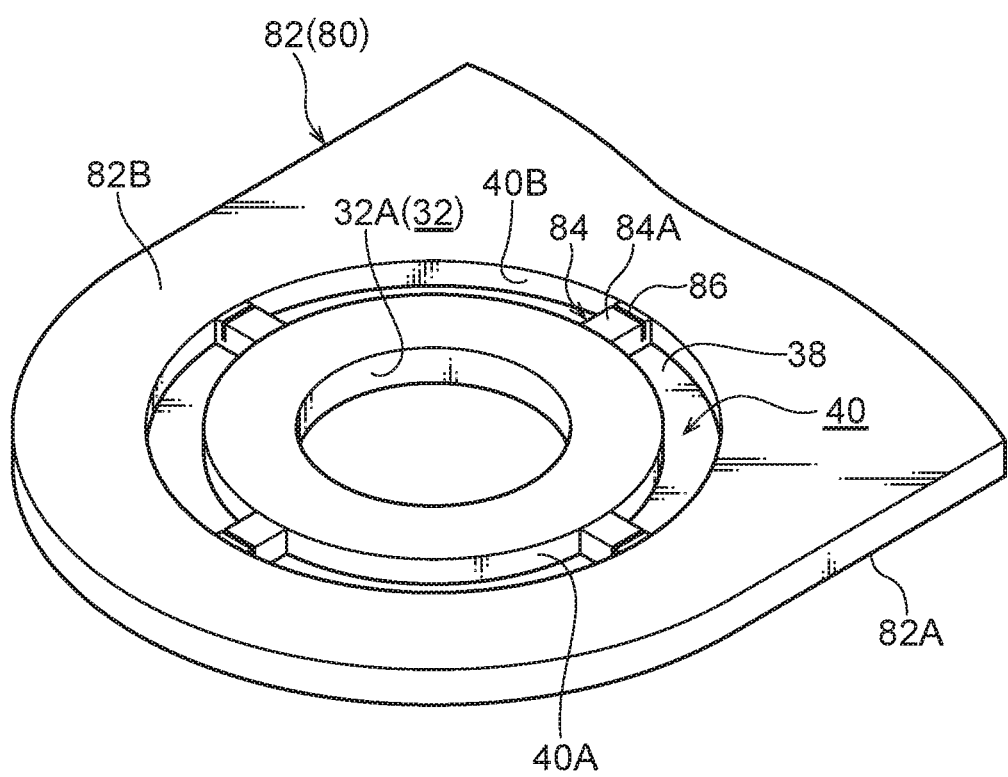
FIG. 10 is a perspective view illustrating the periphery of a through-hole of a fastening seat of a third exemplary embodiment.
Figure 11:
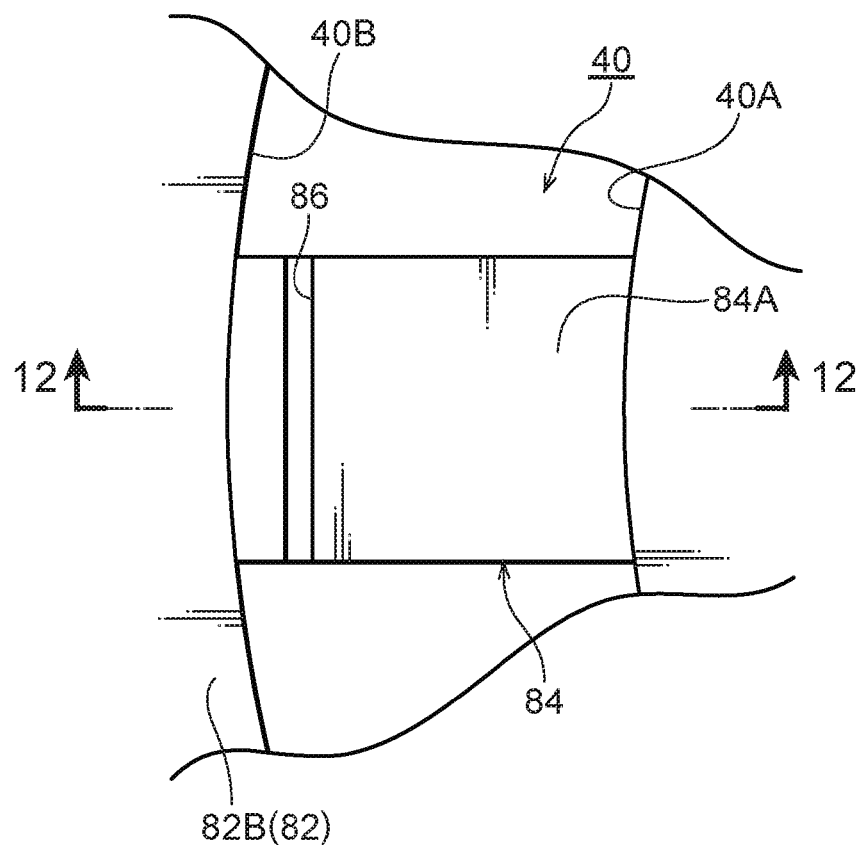
FIG. 11 is a plan view of the fastening seat in FIG. 10.
Figure 12:
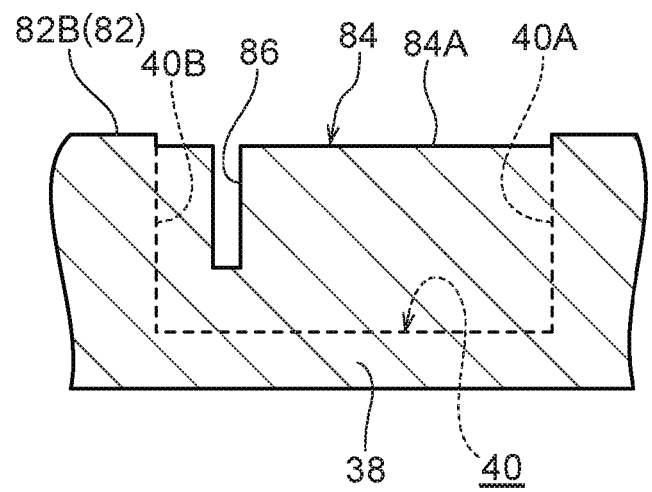
FIG. 12 is a cross-section along line 12-12 in FIG. 11.

As illustrated in FIGS. 10 to 12, the fixing structure 80 of the present exemplary embodiment has a similar configuration to the second exemplary embodiment, with the exception of the configuration of a fastening seat 82. Namely, the fixing structure 80 is configured including the crimped fixing section 22 (not illustrated in FIGS. 10 to 12), the fastening seat 82, and the weak portion 38 (see FIG. 12).

Similarly to the fastening seat 72 of the second exemplary embodiment, the fastening seat 82 has one plate face 82A contacting (in close contact with) the inner face 28C of the tank main body 28, and another plate face 82B formed with the groove portion 40, with coupling portions 84 formed at the groove portion 40. Note that the coupling portions 84 have a wider width than the coupling portions 74 of the second exemplary embodiment, and the rigidity in the removal direction of the portion of the fastening seat 82 corresponding to the groove portion 40 is increased. Similarly to the fastening seat 72 of the second exemplary embodiment, the through-hole 32 is formed in the fastening seat 82.

Plural surfaces 84A of the respective coupling portions 84 are formed at spacings about the circumferential direction of the groove portion 40. Note that four of the coupling portions 84 are formed at equal spacings about the circumferential direction of the groove portion 40 in the present exemplary embodiment.

As illustrated in FIG. 12, a cutout 86 is formed extending along a direction intersecting (an orthogonal direction in the present exemplary embodiment) an extension direction of each coupling portion 84 (hereafter simply referred to as "extension direction") at a surface 84A side of the coupling portion 84. The surface 84A of the coupling portion 84 is divided by the cutout 86.

The cutout 86 is formed in the coupling portion 84 close to the groove wall 40B, and the depth of the cutout 86 from the surface 84A is a depth of an amount that does not reach the bottom face of the groove portion 40.

Explanation follows regarding operation and advantageous effects of the fixing structure 80 of the present exemplary embodiment. Note that explanation regarding operation and advantageous effects similarly obtained in the second exemplary embodiment is omitted.

In the fixing structure 80, each cutout 86 is formed extending in a direction intersecting the extension direction at the surface 84A side of the respective coupling portion 84. This enables the rigidity of the coupling portions 84 in the removal direction to be partially reduced, compared, for example, to a configuration in which the cutout 86 is not formed at the surface 84A side of the coupling portion 84. This enables a difference in rigidity in the removal direction of the portion (including the weak portion 38) of the fastening seat 82 corresponding to the groove portion 40 to be reduced. The breaking of the weak portion 38 is thereby more easily controlled, while securing the rigidity in the removal direction of the portion of the fastening seat 82 corresponding to the groove portion 40.

The first exemplary embodiment is configured such that the inbuilt component 24, this being an inbuilt component of the present disclosure, serves as reinforcement of the tank main body 28; however, the present disclosure is not limited to this configuration. For example, an inbuilt component of the present disclosure may be configured as a clip that retains piping inside the tank main body 28, or as an attachment for attaching another component. Note that the configuration of the inbuilt component described above may also be applied to the second exemplary embodiment and the third exemplary embodiment.

In the first exemplary embodiment, the resin tank of the present disclosure is employed as a fuel tank storing fuel in an automobile; however, the present disclosure is not limited to this configuration. For example, the resin tank of the present disclosure may be employed as a tank storing a fluid other than fuel in an automobile. Note that the application of the resin tank described above may also be applied to the second exemplary embodiment and the third exemplary embodiment.

Exemplary embodiments of the present disclosure have been explained above; however, the present disclosure is not limited to the above description, and obviously various other modifications may be implemented within a range not departing from the spirit of the present disclosure.

All cited documents, patent applications and technical standards mentioned in the present specification are incorporated by reference in the present specification to the same extent as if the individual cited document, patent application, or technical standard was specifically and individually indicated to be incorporated by reference.

What is claimed is:

1. An inbuilt component fixing structure of a resin tank, the inbuilt component fixing structure comprising:
    a plate shaped fastening seat that is provided to an inbuilt component disposed inside a resin tank, that is formed with a through-hole configured to fasten and fix the inbuilt component to the resin tank, and that has a contact face that contacts an inner face of the resin tank that is flat in shape;
    a fixing section that projects out from the inner face of the resin tank and pierces through the through-hole of the fastening seat, the fastening seat being fastened and fixed by being sandwiched between the inner face of the resin tank and a jutting-out portion formed at a portion of the fixing section that has pierced through the through-hole, the jutting-out portion jutting out to a peripheral portion of the through-hole; and
    a weak portion that is formed at a location of the fastening seat corresponding to a periphery of the jutting-out portion, that is thinner than a general portion of the fastening seat, and that has a lower rigidity in a removal direction of the fastening seat than the fixing section.

2. The inbuilt component fixing structure of a resin tank of claim 1, wherein:
    a circular ring-shaped groove portion is formed at a face of the fastening seat at an opposite side in a plate thickness direction to the contact face, so as to surround the jutting-out portion; and
    the weak portion is a thin portion formed between the groove portion and the contact face.

3. The inbuilt component fixing structure of a resin tank of claim 2, wherein a coupling portion, that extends from one groove wall to another groove wall and couples both the groove walls together, is provided to the groove portion.

4. The inbuilt component fixing structure of a resin tank of claim 3, wherein a cutout, that extends along a direction intersecting an extension direction of the coupling portion, is formed at a surface of the coupling portion.

* * * * *